United States Patent
Delpuch

(10) Patent No.: US 9,727,404 B2
(45) Date of Patent: Aug. 8, 2017

(54) SYSTEM AND METHOD FOR REMOTE MAINTENANCE OF USER UNITS

(71) Applicant: OpenTV, Inc., San Francisco, CA (US)

(72) Inventor: Alain Delpuch, Paris (FR)

(73) Assignee: OPENTV, INC., San Francisco, CA (US)

( * ) Notice: Subject to any disclaimer, the term of this patent is extended or adjusted under 35 U.S.C. 154(b) by 242 days.

(21) Appl. No.: 14/303,918

(22) Filed: Jun. 13, 2014

(65) Prior Publication Data

US 2014/0372804 A1     Dec. 18, 2014

(30) Foreign Application Priority Data

Jun. 14, 2013 (EP) ..................................... 13172086

(51) Int. Cl.
*G06F 11/07* (2006.01)
*H04L 12/26* (2006.01)
*H04L 12/24* (2006.01)

(52) U.S. Cl.
CPC .......... *G06F 11/079* (2013.01); *H04L 41/064* (2013.01); *H04L 41/069* (2013.01); *H04L 43/0817* (2013.01)

(58) Field of Classification Search
CPC ............. G06F 11/1048; G06F 11/1044; G06F 11/3636; G06F 11/3466
See application file for complete search history.

(56) References Cited

U.S. PATENT DOCUMENTS

| | | | |
|---|---|---|---|
| 6,615,157 B1 * | 9/2003 | Tsai | H01L 22/20 257/E21.525 |
| 2002/0087967 A1 | 7/2002 | Conkwright et al. | |
| 2003/0055759 A1 | 3/2003 | Conkwright et al. | |
| 2003/0105693 A1 | 6/2003 | Conkwright et al. | |

(Continued)

FOREIGN PATENT DOCUMENTS

| | | |
|---|---|---|
| WO | WO 01/52173 | 7/2001 |
| WO | WO 2006/108685 | 10/2006 |
| WO | WO 2010/001586 | 1/2010 |

OTHER PUBLICATIONS

International Search Report issued in PCT/EP2014/062274 dated Sep. 17, 2014.

(Continued)

*Primary Examiner* — Jigar Patel
(74) *Attorney, Agent, or Firm* — DLA Piper LLP (US)

(57) ABSTRACT

A system and method for remote maintenance of user units allows efficient diagnosis of failures in a reduced time. Each user unit transmits to a management server, via a network, state data related to hardware and software parameters associated to an operating mode of the user unit. The method includes: storing state data in a user unit memory, monitoring state data stored in the memory, and detecting at least one datum of a state indicating an operational failure of the user unit. When a failure is detected, state data corresponding to current states of the user unit at the moment of the failure and state data corresponding to states stored during a predetermined period before the failure are extracted and transmitted to the management server which determines a statistic correlation coefficient between the values of each state of a user unit and the values of states of other user units.

16 Claims, 1 Drawing Sheet

(56) References Cited

U.S. PATENT DOCUMENTS

| | | |
|---|---|---|
| 2003/0105694 A1 | 6/2003 | Conkwright et al. |
| 2003/0110109 A1 | 6/2003 | Conkwright et al. |
| 2003/0149649 A1 | 8/2003 | Conkwright et al. |
| 2005/0138667 A1 | 6/2005 | Delpuch |
| 2006/0128371 A1* | 6/2006 | Dillon .................. H04W 24/00 455/423 |
| 2009/0064268 A1 | 3/2009 | Straub et al. |
| 2009/0158096 A1 | 6/2009 | Ali et al. |
| 2009/0252159 A1* | 10/2009 | Lawson .............. H04M 7/0021 370/352 |
| 2010/0329149 A1* | 12/2010 | Singh ..................... H04L 12/28 370/254 |
| 2011/0320617 A1* | 12/2011 | Annamalaisami .. H04L 63/1458 709/228 |
| 2014/0189086 A1* | 7/2014 | Chattopadhyay ..... H04L 41/145 709/223 |

OTHER PUBLICATIONS

Written Opinion issued in PCT/EP2014/062274 dated Sep. 17, 2014.
European Search Report issued in EP 13 17 2086, dated Aug. 7, 2013.

* cited by examiner

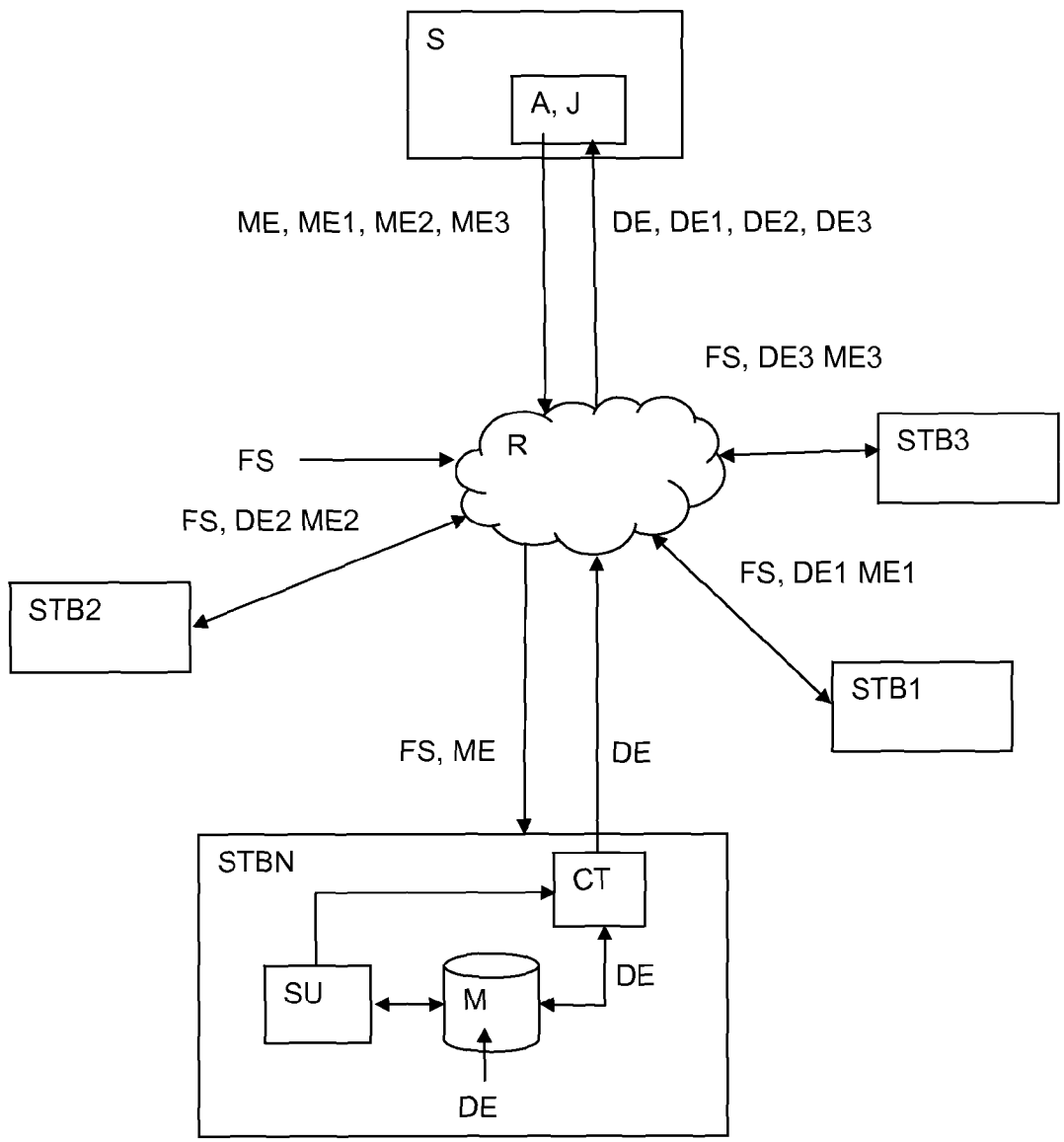

SYSTEM AND METHOD FOR REMOTE MAINTENANCE OF USER UNITS

CROSS-REFERENCE TO RELATED APPLICATIONS

This application claims the benefit of European Application No. EP 13172086.4 filed Jun. 14, 2013, the entirety of which is incorporated herein by reference.

FIELD

The field relates to a system and a method for remote maintenance of user units used for processing digital data of broadcast multimedia services and able to transmit state data to a server via a return channel. More particularly, when a user unit detects an operational failure, it transmits to the server a state data set to be analyzed in order to determine a probable cause of the failure.

TECHNICAL BACKGROUND

Many modern user units such as Pay-TV decoders, personal computers, mobile communication devices (mobile phones, tablets, etc.), routers, energy counters, etc. connected to a communication network such as the Internet are able to transmit to a server log files or functioning history records to be analyzed. Generally speaking, the log files are transmitted when the user unit has a failure preventing its expected operation according to a given mode. For example, during a malfunction of a computer program, the user can be solicited to transmit or not a log file to the supplier of the program or of the computer operating system. This log file allows establishing a statistic of the failures of the program generally used as a basis for deciding corrective actions or creation of program update patches.

The document WO2010/010586A1 describes a real time monitoring system of the state and proper functioning of different units in a communication network. The system uses a real time connection to directly or indirectly interact with an operating system of a network unit in order to obtain a real time messages stream for processing. The messages of the stream are analyzed and introduced into a database as soon as they are produced by real time acquisition of the data of the stream in a format adapted to the database. The data processing and analysis based on predefined algorithms are thus carried out in real time on the contents stored in the database and result in a production of state data. The latter are used to detect defects, to generate reports, alerts, and notifications. The processing of state data by means of a database of solutions allows the system to supply a user with useful recommendations for correcting defects or warnings indicating a defective state of a unit of the network.

Such a real time monitoring system producing permanent messages streams can overload the communication network, especially when content data streams of audio/video services, for example, transit via the same network. Such an overload can cause a decrease of the network performances, in particular a diminution of the bandwidth or the content data throughput.

SUMMARY

Embodiments disclosed herein may achieve the aim of avoiding the drawbacks of the real time monitoring systems for user units producing permanent data streams in a network while allowing at the same time an efficient diagnosis of failures in a reduced time.

This aim may be achieved by a system for remote maintenance of user units comprising a management server and a plurality of user units connected to the management server via a communication network, each user unit being configured for transmitting to the management server, via the communication network, state data related to hardware and software parameters associated to an operating mode of the user unit, the system being characterized in that each user unit comprises:
  a memory configured to store the state data of the user unit comprising variable values related to the user unit states, values indicating a transition from an initial value of a given state towards a final value of the same state and temporary data associated to the states,
  a state data monitoring module configured to detect at least one value of a specific state or a transition of a value of a state indicating an operational failure of the user unit,
  a state data collecting and transmitting module configured to be activated when a failure is detected by the monitoring module, and to extract from the memory state data corresponding to current states of the user unit at the moment of the failure,
  the management server comprising a module for reception and analysis of the state data transmitted by each user unit, said state data forming a log file, said module being at least configured to determine a statistic correlation coefficient resulting from a comparison of the values of each state of all the user units with the values of other states of all the user units.

Also disclosed is a method for remote maintenance of user units connected to a management server via a communication network, each user unit transmitting to the management server, via the communication network, state data related to hardware and software parameters associated to an operating mode of the user unit, the method comprising following steps:
  storing, in a memory of the user unit, state data comprising variable values related to states of the user unit, values indicating a transition from an initial value of a given state towards a final value of the same state and temporary data associated to the states,
  monitoring the state data stored in the memory and detecting at least one value of a specific state or a transition of a value of a state indicating an operational failure of the user unit,
  when a failure is detected, extracting, from the memory, state data corresponding to current states of the user unit at the moment of the failure,
  transmitting the state data to the management server and determining, by the management server, a statistic correlation coefficient resulting from a comparison of the values of each state of all the user units with the values of other states of all the user units.

A user unit transmits state data as soon as a failure appears, or a series of successive or sporadic failures or an operational defect indicated by a value of a particular state or by a transition from an initial value of a state towards a final value corresponding to a failure. The management server creates a log file containing the state data of each user unit and also a trace including stored state data related to a predetermined time period preceding the failure.

The states appear in several forms:
variable digital values according to the operating mode of the user unit such as the number of the selected channel, the temperature or the filling rate of the hard disk, the quality of the signal etc., which have various values according to the functioning of the user unit.
alphanumeric character strings such as smart card or security module identifiers, channel or application identifiers, etc.
enumerations related to states being able to take a predefined number N of values.

For example, for N=2, a state "crash" is represented by a binary value indicating a state of normal operating: "crash=0" and a state indicating a failure: "crash=1".

The states are preferably associated to temporary data like the date and the time indicating the moment at which a particular event occurred such as for example a failure or a sudden decrease of the signal quality or an increase of the channel change time. An abnormal variation of a digital value like for example when the switching time from a current channel to another channel significantly increases, the value of a "zap time" state exceeds a predefined threshold which leads to a transition represented by a "slow zap" state which passes from a value 0 to a value 1. As used herein, "zapping" refers to changing channels and is a synonym for what is colloquially known as "channel hopping" or "channel surfing."

The log file thus contains for each state a value associated to a time datum (date and time) and a transition associated to a time datum indicating the date and the time at which the transition took place. A transition reflects a passage of a state from an initial value towards a final value which may indicate a failure and activate the transmission of the state data to the management server.

In order to allow a processing and a statistical analysis in form of tables and/or graphs, a large number of user units, for example several thousands, transmit to the management server a high number of state data, for example data related to 100 or even 200 states referred to a predefined time period.

The state data refer to a selection of hardware and software parameters associated to the functioning of the user unit independently of the failure or the defect detected by the monitoring module. Thus for different types of failures, the management server can receive state data relating to a same selection of states having different values. The states selection depends on a setup of the monitoring module pre-established by the manufacturer of the user unit, and/or an operator skilled in the maintenance of the user units who selects states to be monitored made available by a supplier of the software installed in the user units.

The log file tracing back the behavior of the users units is intended to be analyzed by the management server which establishes correlations by comparing the state data of each user unit. For example, in order to show that the switching time from a current channel towards another channel depends on the filling rate of the hard disk, the comparison will relate to user units having a hard disk with different filling rate values. The analysis of the correlation results in form of coefficients gives useful indications for interpreting a failure in order to find its cause and appropriate solutions for solving it.

The user units can also transmit state data to the management server when no failure is detected by the monitoring module, for example after a request of the server or automatically at predefined time intervals. These state data of "healthy" user units serve as references during the analysis of a log file to determine the origin(s) of the failure.

BRIEF DESCRIPTION OF THE FIGURE

FIG. 1 shows a block diagram of the system comprising user units each transmitting state data to a management server when a failure is detected.

DETAILED DESCRIPTION

The system illustrated by FIG. 1 includes a user unit STBN in form of a Pay-TV decoder also called set top box. It is connected to a management server S via a communication network R. The user unit STBN is configured for receiving a digital data stream FS of multimedia services from the network R or any other wired or radio broadcast network and for transmitting state data DE to the management server S via the network R thanks to a return channel. Other user units STB1, STB2, STB3 configured for transmitting state data DE1, DE2, DE3 when failures occur are also connected to the management server S.

The user unit STBN stores, in a memory M, state data DE related to hardware and software parameters associated to an operation mode of the user unit. These state data DE are preferably stored when one or more predefined states change their value. A monitoring module SU is in charge of detecting one or more state data DE indicating one or more failures or functioning anomalies which lead to transitions of states causing the transmission of the state data DE to the management server S.

The log file J containing the states of user units with their values and the transitions associated to a date and a time is converted by the server by transforming the transitions into states with two values 0 or 1 in order to allow their analysis by correlations. For example, an abrupt passage from a value of a state representing the normal functioning of the user unit towards a critical value recorded in form of a transition is converted into a state "crash" whose value 0 indicates the normal functioning and the value 1 a failure. A state indicating the remaining capacity of a hard disk which reaches a value near zero is converted into "disk full =1" indicating a full hard disk. A "slow zap=1" state indicating a low speed of channel change results from a "zap speed" state whose value is lower than a predefined threshold.

A failure or functional defect is generally defined by a value related to a state situated over or under a foreseen limit value or a reference value measured during a normal functioning of the user unit. The monitoring module SU includes filters and comparators associated to a selection of states to be monitored. A failure is recognized by one or more states values out of limits and/or by an abnormally high number of states values out of limits recorded in the memory at many time intervals, or by high warnings frequency related to abnormal states. A particular state, for example "crash", can indicate a failure related to a set of states.

When a critical state compromising the normal functioning of a user unit such as, for example, "crash", "disk remaining capacity", "signal strength", etc. transits from a neutral value towards an active value, the monitoring module SU activates a collecting and transmission module CT which collects state data sets stored in the memory M related to states monitored by the monitoring module SU and state data sets recorded during a predefined period before the failure. These state data sets are then transmitted via the communication network R to the management server S that includes an analysis module A in charge of analyzing them.

For example in the log file J, a "crash=1" state may indicate a failure when a current states configuration does not correspond to a states configuration related to a normal functioning of the user unit STBN defined by the state "crash=0".

The temporary data associated to the states do not only indicate the date and time at which a state value has been recorded in the memory but also the date and time at which a transition from an initial state value towards a final value took place such as, for example, the transition from the state "crash" 0 to 1. Some states are determined by temporal data of other states. For example a "zap speed" state indicating a low speed of reception channel change is determined by the time interval between leaving a current channel (current channel state=12) and activating a new channel (new channel state 18). When this time interval is higher than a reference time interval, the "zap speed" state takes an insufficient value in comparison with a normal value which leads to the "slow zap=1" state in the log file J. This time interval depends on factors like: the reaction time of the user unit to the remote control, the time for adjusting the new channel, the reception and connection time of the program tables PAT, PMT, the verification time of the conditional access or the parental control, the display time of the first image, etc. All these factors can also be represented by states monitored by the monitoring module SU and transmitted to the management server S if necessary.

According to an embodiment, the conversion of the transitions into states with two values can be performed by the monitoring module SU of each user unit. The state data are thus transmitted to the management server S by the collecting and transmission module CT when one or several of these states with two values take a value 0 or 1 indicating a failure.

According to an embodiment, on reception of state data by the management server S, the analysis module A of the latter can transmit to the user unit STBN a response message ME which will be processed by the monitoring module SU in order to indicate that the failure is managed by the management server S. The message ME can also indicate the states of the user unit STBN involved in a failure, a probable cause of the failure, a solution or a particular adjustment to carry out on the user unit STBN for resolving the failure.

According to an option, the management server S can send to one or more user units a request comprising a command for transmitting the states data recorded within a given period concerning predefined states. These states data related to healthy user units can serve as a reference for a future failure analysis. According to a configuration, the request sent by the management server S could activate the monitoring module SU in the same way as at the apparition of one or several failures so that the collecting and transmission module CT transmits the state data. The management server S can also solicit the transmission of the state data when a user calls the maintenance operator for a fast failure resolution.

The management server S is also in charge of sending a setup file to the user units comprising a list of states to be monitored and collected, a list of the transitions of the state values being able to activate the transmission of state data by the collecting and transmission module CT. This setup file may also contain some transmission instructions indicating for example a transmission frequency of the state data (number of times per hour, per day, etc.), and/or instructions related to states, state values or value transitions being able to activate the transmission of the state data without indicating a failure. For example, state data can be transmitted when the measured temperature of the hard disk exceeds 60° C. The instructions of the setup file also allow preventing a saturation of the management server S due to a large state data log file issued from a million user units for example. In this case, a probability (percentage) of transmission is associated to each type of transition activating the state data transmission. For example, when the temperature of the disk exceeds 50° C., the state data are transmitted 5 times out of 100 or with a probability of 5%.

According to a preferred configuration, the state data comprise, besides the state data of the user unit, at least one identification information of the user unit in form of a unique serial number, an identifier of an associated security module, a MAC address, an IP address, or an identifier of a network node comprising the user unit STBN. The personalization of the state data allows the management server S transmitting response messages ME targeted to the concerned user units STBN of the network R.

According to another embodiment, the state data can be anonymous. In this case, it preferably contains a digest (hash) calculated by the user unit STBN by means of a mathematical collision free unidirectional hash function on all or part of the state data. This digest allows the server to validate the state data by comparing the received digest with a digest calculated by the management server S on the state data received from the user unit STBN. If the comparison is successful, the management server S recognizes the state data as being conform and coming from a user unit STBN connected to the communication network R.

According to another embodiment, the state data containing identification information of the user unit can also include a digest (hash) calculated on all or part of the data. According to the communication protocol established between the user units and the management server, the state data are already accompanied by a digest like for example in the case of a transmission in TCP/http mode where the transmitted data include a Cyclic Redundancy Check (CRC).

Moreover, in order to avoid abuse by transmissions of sensitive data to unauthorized systems, the management server S is authenticated by known means and the data transmitted via the return channel secured. In particular, the state data are encrypted by the user unit STBN by means of a transmission key known by the management server S.

In order to limit the number of user units STBN calling the server by the return channel on the basis of already received state data, the management method of the return channel described in the document US20050138667 can be used. This method allows controlling a return channel leading towards a source system in an interactive television environment. An indication based on information associated to the interactive television environment is generated by the source system and broadcast to a plurality of receiver systems where each receiver system controls the return channel on the basis of the indication in order to avoid a saturation of the server. For example when a radio reception application breaks down 3 times a day on one million subscriber terminals, the server would receive 3 million state data sets without the control indication thanks to which this large number of units can be reduced to the minimum necessary for drawing up statistics. In other words, when state data sets are transmitted at a high frequency, the server can reduce this frequency thanks to this control indication.

Such an indication is expressed by a digital value linked to a transition and to a transmission probability of the state data monitored in real time by one or more receiver systems of which each compares the indication with a random value to determine the use of the return channel. Thus, the user benefits from a foreseen service quality, as he can obtain an access to the return channel when the service is less likely to be refused because of an insufficient capacity of the return channel in form of lack of server resources, modems or other system resources. The indication may be monitored by a contents supplier who can change the interactive contents broadcast to the receiver systems in order to increase or reduce the probability that a user attempts to use the return channel.

The example developed hereinafter based on establishing statistical correlations among the state data shows a preferred realization of the invention.

The user unit monitors 11 states: DC1234, ST3456, SD, HD, MPG, AC3, subtitle, bookings (contents reservations), slow zap, crash (failure) and stand-by, which state data form the lines of the table 1. These lines correspond to 16 user units that each has transmitted 11 states to the management server S, these states having been previously extracted from their memory M.

When one or several failures are detected by the monitoring module SU, the collecting and transmission module CT recovers state data on the one hand from broken-down user units "crash=1" and on the other hand from user units without failure "crash=0", but with a "slow zap=1" state for example.

In table 1, 8 user units designated by numbers 2, 4, 5, 7, 8, 12, 15, and 16 have failures which are indicated (crash=1) while 8 others do not present any failure (crash=0). The 16 state data sets thus constitute a log file J which will be analyzed by the server S by calculating the statistic correlation coefficients (table 2) resulting from comparisons between the different states values of the columns of table 1 taken two by two. The entries in table 2 give the correlation of the states of the columns two by two.

According to a preferred configuration of the monitoring module SU, when a state data set is transmitted to the server S at the apparition of one or several failures, the latter is generally shifted towards a location of the memory consecutive to the one used to store the current state data. A history record of the states is thus kept during a predetermined time period at the end of which new state data replace the old state data transmitted to the server. This replacement can also be done when a predetermined number of shifts are reached, a number that can be fixed for example by the setup file that the server transmits to the user units.

TABLE 1 state data examples related to some functioning parameters or states of 16 digital television decoders.

| Log # | DC1234 | ST3456 | SD | HD | MPG | AC3 | subtitle | bookings | slow zap | crash | stand-by |
|---|---|---|---|---|---|---|---|---|---|---|---|
| 1 | 1 | 0 | 0 | 1 | 1 | 0 | 0 | 6 | 1 | 0 | 0 |
| 2 | 0 | 1 | 1 | 0 | 0 | 1 | 1 | 4 | 1 | 1 | 0 |
| 3 | 1 | 0 | 1 | 0 | 1 | 0 | 0 | 5 | 1 | 0 | 0 |
| 4 | 0 | 1 | 1 | 0 | 0 | 1 | 1 | 1 | 0 | 1 | 0 |
| 5 | 0 | 1 | 0 | 1 | 0 | 1 | 1 | 6 | 1 | 1 | 0 |
| 6 | 1 | 0 | 1 | 0 | 0 | 1 | 0 | 7 | 1 | 0 | 0 |
| 7 | 1 | 0 | 1 | 0 | 1 | 0 | 1 | 2 | 0 | 1 | 0 |
| 8 | 0 | 1 | 0 | 1 | 0 | 1 | 1 | 1 | 0 | 1 | 0 |
| 9 | 1 | 0 | 0 | 1 | 1 | 0 | 0 | 6 | 1 | 0 | 0 |
| 10 | 0 | 1 | 0 | 1 | 0 | 1 | 1 | 4 | 1 | 0 | 0 |
| 11 | 0 | 1 | 1 | 0 | 0 | 1 | 0 | 3 | 1 | 0 | 0 |
| 12 | 0 | 1 | 1 | 0 | 0 | 1 | 1 | 0 | 0 | 1 | 0 |
| 13 | 1 | 0 | 1 | 0 | 0 | 1 | 0 | 6 | 1 | 0 | 0 |
| 14 | 0 | 1 | 1 | 0 | 1 | 0 | 0 | 4 | 1 | 0 | 0 |
| 15 | 0 | 1 | 1 | 0 | 1 | 0 | 1 | 2 | 0 | 1 | 0 |
| 16 | 0 | 1 | 0 | 1 | 0 | 1 | 1 | 4 | 0 | 1 | 1 |

TABLE 2 correlation coefficients between the states data of columns of the table 1

| | DC1234 | ST3456 | SD | HD | MPG | AC3 | subtitle | bookings | slow zap | crash | stand-by |
|---|---|---|---|---|---|---|---|---|---|---|---|
| DC1234 | 1.00 | | | | | | | | | | |
| ST3456 | −1.00 | 1.00 | | | | | | | | | |
| SD | 0.07 | −0.07 | 1.00 | | | | | | | | |
| HD | −0.07 | 0.07 | −1.00 | 1.00 | | | | | | | |
| MPG | 0.47 | −0.47 | 0.07 | −0.07 | 1.00 | | | | | | |
| AC3 | −0.47 | 0.47 | −0.07 | 0.07 | −1.00 | 1.00 | | | | | |
| subtitle | −0.62 | 0.62 | −0.16 | 0.16 | −0.36 | 0.36 | 1.00 | | | | |
| bookings | 0.57 | −0.57 | −0.26 | 0.26 | 0.13 | −0.13 | −0.63 | 1.00 | | | |
| slow zap | 0.33 | −0.33 | −0.07 | 0.07 | 0.07 | −0.07 | −0.68 | 0.80 | 1.00 | | |
| crash | −0.52 | 0.52 | 0.00 | 0.00 | −0.26 | 0.26 | 0.88 | −0.63 | −0.77 | 1.00 | |
| stand-by | −0.20 | 0.20 | −0.33 | 0.33 | −0.20 | 0.20 | 0.23 | 0.02 | −0.33 | 0.26 | 1.00 |

The correlation coefficients $r_p$ of the table 2 are calculated by the server S using the formula below:

$$r_p = \frac{\sigma_{xy}}{\sigma_x \sigma_y} \quad (1)$$

where $\sigma_{xy}$ refers to the covariance between the variables x and y, and $\sigma_x$, $\sigma_y$ the standard deviation of the variable x, respectively of the variable y.

In the example, the correlation coefficient $r_p$ is calculated between two series x and y of same length each containing 16 state values of each of the 16 user units of x $(x_1, \ldots, x_{16})$ and of y $(y_1, \ldots, y_{16})$ of the columns corresponding to each of the 11 states (DC1234, ST3456, SD, HD, MPG, AC3, subtitle, bookings, slow zap, crash and standby) of table 1.

The covariance between the variable x and y $\sigma_{xy}$ is calculated in the following way:

$$\sigma_{xy} = \frac{1}{N} \sum_{i=1}^{N} (x_i - \bar{x}) \cdot (y_i - \bar{y}) \quad (2)$$

where the index i evolves from 1 to N=16 which is the number of state sets of each of the 16 user units taken into account and where:

$$\bar{x} = \frac{1}{N} \sum_{i=1}^{N} x_i \text{ is the average of the values of } x \quad (3)$$

$$\bar{y} = \frac{1}{N} \sum_{i=1}^{N} y_i \text{ is the average of the values of } y \quad (4)$$

The standard deviations $\sigma_x$ and $\sigma_y$ are calculated in the following way:

$$\sigma_x = \sqrt{\frac{1}{N} \sum_{i=1}^{N} (x_i - \bar{x})^2} \quad (5)$$

$$\sigma_y = \sqrt{\frac{1}{N} \sum_{i=1}^{N} (y_i - \bar{y})^2} \quad (6)$$

The starting formula (1) becomes the following by replacing $\sigma_{xy}$, $\sigma_x$ and $\sigma_y$ according to the above definitions (2) to (6):

$$r_p = \frac{\sum_{i=1}^{N} (x_i - \bar{x}) \cdot (y_i - \bar{y})}{\sqrt{\sum_{i=1}^{N} (x_i - \bar{x})^2} \cdot \sqrt{\sum_{i=1}^{N} (y_i - \bar{y})^2}} \quad (7)$$

The correlation coefficient $r_p$ thus calculated takes values between −1 and +1, including the extreme values −1 and +1.

The correlation coefficient $r_p$ is equal to +1 if one of the variables x or y is an increasing function of the other variable y or x. It is equal to −1 if the function is decreasing. The intermediate values inform on the degree of linear dependence between the two variables x and y. The nearer the coefficient $r_p$ is to the extreme values −1 and +1; the stronger is the correlation between the variables. A correlation coefficient $r_p$ equal to 0 means that the variables x and y are not correlated, thus independent one from the other.

A negative correlation coefficient near −1 can indicate a strong correlation in the same way as a positive coefficient near +1 according to the value of the concerned states. In fact, a state indicating for example a hard disk filling rate of 40% is complementary to a state indicating the remaining space of 60% of the same disk. Correlations carried out between these complementary states with other states will have same coefficients but with opposed signs.

In table 2, the correlation coefficient $r_p$ between the "subtitle" and "crash" states is 0.88, near +1. This means that the failures indicated by "crash=1" are certainly linked to the use of subtitles during the visualization of programs. For example, the subtitles are illegible, incomplete, or displaced because of missing data packets in the transmitted subtitles stream associated to the program currently being viewed.

The correlation coefficient 0.8 between the "booking" and "slow zap" states also near +1 shows that when the number of bookings increases, the zapping speed is reduced. A probable cause of this low zapping speed would be a large number of bookings carried out and/or an insufficient broadcast rhythm of program tables PMT and/or event information tables EIT.

The failures "crash" are independent from the operation mode of the user unit in high definition (HD) or in standard definition (SD), the correlation coefficient being equal to 0.

In this example, the failures "crash" are not expressly linked to the number of reservations "bookings" and to the low zapping speed "slow zap" as their respective correlation coefficient is negative −0.63 and −0.77 respectively. In other words, the "bookings" and "slow zap" states are not directly concerned by the failure <<crash=1>>.

A high correlation coefficient (near −1 or +1) does not imply necessarily a causality relation between the two measured states. In fact, the two states can be correlated to a same initial state in form of a third not measured state on which the two others depend. In this case, the correlation coefficient, while indicating the states involved in the failure, also gives an indication in which direction a cause of the failure is to be searched.

The addition of measurements of other states which may have no relation with the states measured before, like for example the measurement of states during another operation mode of the user unit such as standby, the DVB (Digital Video Broadcast) reception mode or IP (Internet Protocol), the interactive mode, etc., can sometimes appear useful for establishing more appropriate correlations.

The determination of correlation coefficients as in the above example allows rapidly establishing and simplifying the interpretation of the links between the states of the user unit in order to target the search of a cause of detected failure(s).

This advantage becomes important when the server processes a very large number of user units for which it also establishes failure statistics and state history records. Moreover, parameters external to the user units such as the global state of the communication network, the level and the quality of the transmitted signals, the bandwidth or the data throughput, the load, etc. can also be correlated with states representing the behavior of a user unit or a group of user units. For example a big network load can degrade the quality of the reception of high definition programs which leads to failures "crashes" linked for example to the "HD", "slow zap" states, or to a too slow decoding leading to an incomplete and/or jerky image display.

The invention claimed is:

1. A system for remote maintenance of user units comprising:
   a management server; and
   a plurality of user units connected to the management server via a communication network, each user unit being configured for transmitting to the management server, via the communication network, state data related to hardware and software parameters associated to an operation mode of the user unit;
   wherein each user unit comprises:
      a memory configured to store the state data of the user unit comprising variable values related to states of the user unit, values indicating a transition from an initial value of a given state towards a final value of the same state and temporal data associated to the states;
      a state data monitoring module configured to detect at least one value of a specific state or a transition of a value of a state indicating an operational failure of the user unit; and
      a state data collecting and transmission module configured to be activated when a failure is detected by the monitoring module, and to extract from the memory and transmit to the management server state data corresponding to current states of the user unit at the moment of the failure; and
   wherein the management server is configured to receive and analyze the state data transmitted by each user unit, to determine relations between the state data from a statistic correlation coefficient between a series x of values of a state of each user unit and a series v of values of another state of each user unit, the statistic correlation coefficient having a value near the extreme values of +1 or −1 indicating states involved in a failure, and to transmit to each user unit a setup file comprising at least a list of states to be monitored and collected and a list of state value transitions for activating transmission of state data by the state data collecting and transmission module of each user unit.

2. The system according to claim 1, wherein the state data collecting and transmission module transmits state data corresponding to states stored during a predetermined period before the failure, in addition to the current states of the user unit at the moment of the failure.

3. The system according to claim 1, wherein the management server transmits at least one response message coming from the analysis module to the user unit, said response message indicating that the failure detected by the monitoring module is managed by the management server.

4. The system according to claim 3, wherein the response message indicates the states of the user unit involved in a failure, a probable cause of said failure, a solution or a particular adjustment to be carried out on the user unit for solving the failure.

5. The system according to claim 1, wherein the state data comprise, besides the state values of the user unit, at least one piece of identification information of the user unit.

6. The system according to claim 1, wherein the state data are anonymous.

7. The system according to claim 1, wherein the state data contain a digest calculated by the user unit using a mathematical collision free unidirectional hash function on all or part of the state data, said digest being used for a validation of said data by the management server.

8. The system according to claim 1, wherein the user unit is further configured to encrypt the state data by means of a transmission key known by the management server.

9. The system according to claim 1, wherein the monitoring module is configured to rewrite, in the memory, new state data instead of previous state data when state data is transmitted to the server when one or more failures are detected.

10. A system for remote maintenance of user units comprising:
   a management server; and
   a plurality of user units connected to the management server via a communication network, each user unit being configured for transmitting to the management server, via the communication network, state data related to hardware and software parameters associated to an operation mode of the user unit
   wherein each user unit comprises:
      a memory configured to store the state data of the user unit comprising variable values related to states of the user unit, values indicating a transition from an initial value of a given state towards a final value of the same state and temporal data associated to the states;
      a state data monitoring module configured to detect at least one value of a specific state or a transition of a value of a state indicating an operational failure of the user unit and
      a state data collecting and transmission module configured to be activated when a failure is detected by the monitoring module, and to extract from the memory and transmit to the management server state data corresponding to current states of the user unit at the moment of the failure; and
   wherein the management server is configured to receive and analyze the state data transmitted by each user unit, to determine a statistic correlation coefficient resulting from a comparison of the values of each state of all the user units with the values of other states of all the user units; and to transmit to each user unit a setup file comprising at least a list of states to be monitored and collected and a list of state value transitions for activating transmission of state data by the state data collecting and transmission module of each user unit, and to transmit instructions related to states, state values or value transitions for activating the transmission of state data without indicating a failure.

11. A method for remote maintenance of user units connected to a management server via a communication network, each user unit transmitting to the management server, via the communication network, state data related to hardware and software parameters associated to an operation mode of the user unit, the method comprising:
   reading by the user unit a setup file provided by the management center, the setup file comprising at least a list of states to be monitored and collected and a list of state value transitions for activating transmission of state data by each user unit to the management center, and instructions related to states, state values or value transitions for activating transmission of state data without indicating a failure by each user unit to the management center,
   storing, in a memory of the user unit, state data comprising variable values related to states of the user unit, values indicating a transition from an initial value of a given state towards a final value of the same state, and temporal data associated to the states;

monitoring the state data stored in the memory and detecting at least one value of a specific state or a transition of a value of a state indicating an operational failure of the user unit;

when a failure is detected, extracting, from the memory, state data corresponding to current states of the user unit at the moment of the failure; and transmitting the state data to the management server and determining, by the management server, a statistic correlation coefficient resulting from a comparison of the values of each state of all the user units with the values of other states of all the user units.

12. The method according to claim 11, wherein the management server transmits at least one response message to the user unit, said response message indicating that the detected failure managed by the management server.

13. The method according to claim 12, wherein the response message indicates the states of the user unit involved in a failure, a probable cause of said failure, a solution or a particular adjustment to be carried out on the user unit for solving the failure.

14. A user unit connectable to a management server via a communication network the user unit comprising:

a memory configured to store the state data of the user unit comprising variable values related to states of the user unit, values indicating a transition from an initial value of a given state towards a final value of the same state and temporal data associated to the states;

a state data monitoring module configured to detect at least one value of a specific state or a transition of a value of a state indicating an operational failure of the user unit; and a state data collecting and transmission module configured to be activated when a failure is detected by the monitoring module, and to extract from the memory and transmit to the management server state data corresponding to current states of the user unit at the moment of the failure;

the state data monitoring module being further configured to read a setup file provided by the management center, the setup file comprising at least a list of states to be monitored and collected and a list of state value transitions for activating transmission of state data by the state data collecting and transmission module, the list of states to be monitored and collected being based at least in part on relations between the state data from a statistic correlation coefficient between a series of x values of a state of the user unit and other user units and a series of y values of another state of the user unit and other user units, the statistic correlation coefficient having a value near the extreme values of +1 or −1 indicating states involved in a failure.

15. The user unit of claim 14, wherein the state data collecting and transmission module is further configured to extract from the memory and transmit to the management server state data corresponding to states of the user unit during a predetermined period before the failure in addition to the states of the current states of the user unit at the moment of the failure.

16. A method for remote maintenance of user units connected to a management server via a communication network, each user unit transmitting to the management server, via the communication network, state data related to hardware and software parameters associated to an operation mode of the user unit, the method comprising:

reading by the user unit a setup file provided by the management center, the setup file comprising at least a list of states to be monitored and collected and a list of state value transitions for activating transmission of state data by each user unit to the management center;

storing, in a memory of the user unit, state data comprising variable values related to states of the user unit, values indicating a transition from an initial value of a given state towards a final value of the same state, and temporal data associated to the states;

monitoring the state data stored in the memory and detecting at least one value of a specific state or a transition of a value of a state indicating an operational failure of the user unit;

when a failure is detected, extracting, from the memory, state data corresponding to current states of the user unit at the moment of the failure; and transmitting the state data to the management server and determining, by the management server, relations between the state data from a statistic correlation coefficient between a series x of values of a state of each user unit and a series y of values of another state of each user unit, the statistic correlation coefficient having a value near the extreme values of +1 or −1 indicating states involved in a failure.

* * * * *